United States Patent
Zhao et al.

(10) Patent No.: US 11,663,165 B2
(45) Date of Patent: May 30, 2023

(54) METHOD, ELECTRONIC DEVICE, AND COMPUTER PROGRAM PRODUCT FOR MANAGING FILE SYSTEM

(71) Applicant: EMC IP Holding Company LLC, Hopkinton, MA (US)

(72) Inventors: Chaojun Zhao, Chengdu (CN); Jia Huang, Chengdu (CN); Hongyuan Zeng, Chengdu (CN); Hao Wang, Chengdu (CN); Mingyi Luo, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/077,010

(22) Filed: Oct. 22, 2020

(65) Prior Publication Data
US 2022/0100707 A1   Mar. 31, 2022

(30) Foreign Application Priority Data
Sep. 29, 2020   (CN) .......................... 202011051335.8

(51) Int. Cl.
*G06F 16/174*   (2019.01)
*G06F 16/13*    (2019.01)

(52) U.S. Cl.
CPC .......... *G06F 16/1744* (2019.01); *G06F 16/13* (2019.01)

(58) Field of Classification Search
CPC .............................. G06F 16/1744; G06F 16/13
See application file for complete search history.

(56) References Cited

U.S. PATENT DOCUMENTS

| | | | | | |
|---|---|---|---|---|---|
| 5,765,157 | A | * | 6/1998 | Lindholm | G06F 9/4843 |
| 5,924,092 | A | * | 7/1999 | Johnson | G06F 7/24 |
| 6,043,763 | A | * | 3/2000 | Levine | H03M 7/46 |
| | | | | | 341/51 |
| 6,828,925 | B2 | * | 12/2004 | McCanne | H03M 7/30 |
| | | | | | 341/51 |
| 7,720,818 | B1 | * | 5/2010 | Laura | G06Q 40/02 |
| | | | | | 707/661 |
| 7,814,284 | B1 | * | 10/2010 | Glass | H03M 7/30 |
| | | | | | 711/154 |
| 8,578,058 | B2 | * | 11/2013 | Demidov | H03M 7/6088 |
| | | | | | 709/247 |

(Continued)

OTHER PUBLICATIONS

Conway et al., "File Systems Fated for Senescence? Nonsense, Says Science!", USENIX Association (Year: 2017).*

(Continued)

*Primary Examiner* — Debbie M Le
*Assistant Examiner* — Huen Wong
(74) *Attorney, Agent, or Firm* — Ryan, Mason & Lewis, LLP

(57) ABSTRACT

A method, an electronic device, and a computer program product for managing a file system are provided. For example, the method comprises causing multiple data blocks to be written to a storage space of the file system, the size of each of the multiple data blocks being not lower than a threshold size, and creating at least one space fragment in the storage space, the size of each of the at least one space fragment not exceeding the threshold size. Therefore, this solution can quickly and efficiently age a file system.

20 Claims, 13 Drawing Sheets

(56) References Cited

U.S. PATENT DOCUMENTS

| | | | | |
|---|---|---|---|---|
| 9,026,505 B1* | 5/2015 | Huang | G06F 16/1748 | 707/693 |
| 10,503,695 B2* | 12/2019 | Zhai | G06F 16/1727 | |
| 10,613,787 B2* | 4/2020 | Yu | G06F 3/0608 | |
| 2003/0061457 A1* | 3/2003 | Geiger | G06F 12/08 | 711/165 |
| 2003/0169934 A1* | 9/2003 | Naito | H04N 19/15 | 382/239 |
| 2005/0063599 A1* | 3/2005 | Sato | H04N 19/647 | 375/E7.199 |
| 2005/0071579 A1* | 3/2005 | Luick | G06F 12/0802 | 711/170 |
| 2006/0156213 A1* | 7/2006 | Kikutake | G11C 29/24 | 714/E11.05 |
| 2006/0184505 A1* | 8/2006 | Kedem | G06F 3/0608 | |
| 2007/0208893 A1* | 9/2007 | Azzarello | G06F 16/1744 | 710/68 |
| 2007/0288651 A1* | 12/2007 | Nassor | H04N 21/2385 | 709/231 |
| 2009/0307250 A1* | 12/2009 | Koifman | G06F 12/023 | |
| 2010/0036863 A1* | 2/2010 | Koifman | G06F 21/62 | 707/602 |
| 2010/0296745 A1* | 11/2010 | Strom | H04N 19/176 | 382/233 |
| 2011/0276547 A1* | 11/2011 | Koifman | G06F 3/0638 | 707/693 |
| 2012/0197917 A1* | 8/2012 | Koifman | G06F 21/78 | 707/756 |
| 2013/0251261 A1* | 9/2013 | Blum | H04N 19/187 | 382/176 |
| 2015/0293700 A1* | 10/2015 | Sasaki | G06F 3/0686 | 711/113 |
| 2016/0231942 A1* | 8/2016 | Koifman | G06F 16/1744 | |
| 2017/0220593 A1* | 8/2017 | Tripathy | G06F 16/1748 | |
| 2017/0272095 A1* | 9/2017 | Revell | H03M 7/42 | |
| 2019/0339876 A1* | 11/2019 | Auvenshine | G06F 3/0608 | |
| 2020/0242725 A1* | 7/2020 | Brigg | G06F 9/30018 | |

OTHER PUBLICATIONS

Wikipedia, "File System," https://en.wikipedia.org/w/index.php?title=File_system&oldid=980327893, Sep. 25, 2020, 22 pages.

M. Rouse, "Data Availability," https://searchstorage.techtarget.com/definition/data-availability#:~:text=Data%20availability%20is%20a%20term,In%20general%2C%20data%20availability%20is, Sep. 2005, 4 pages.

Wikipedia, "Data Loss," https://en.wikipedia.org/w/index.php?title=Data_loss&oldid=956578705, May 14, 2020, 4 pages.

* cited by examiner

METHOD, ELECTRONIC DEVICE, AND COMPUTER PROGRAM PRODUCT FOR MANAGING FILE SYSTEM

RELATED APPLICATION(S)

The present application claims priority to Chinese Patent Application No. 202011051335.8, filed Sep. 29, 2020, and entitled "Method, Electronic Device, and Computer Program Product for Managing File System," which is incorporated by reference herein in its entirety.

FIELD

Embodiments of the present disclosure generally relate to a method, a device, and a computer program product for managing a file system.

BACKGROUND

In the processing of operations by a user in a file system, a large amount of data unavailability and data loss time are caused by conflicts of timing, locks, threads, and contents. Such conflicts are especially obvious in a file system after long-term use, where problems such as out of memory (OOM), emergencies, file system offline, and thread blocking often occur. The long-term use of the file system causes aging of the system as well as performance degradation. The performance loss with respect to an aged file system on a solid state drive (SSD) may be more serious than the loss on a hard drive disk (HDD).

In conventional solutions, in order to discover these problems, a large number of test operations are usually performed, such as unit tests, functional tests, integration tests, stress tests, and endurance tests. However, since a user's file system generally has already aged after a long period of use, the storage array has recovered from many failures, and uninterrupted upgrades and re-initialization are rarely performed. While most current system tests are performed on newly created memory arrays, there is a significant difference between the system test environment and the user file system. However, it is difficult to discover the above problems in common system environment tests.

SUMMARY

A method, a device, and a computer program product for managing a file system are provided in embodiments of the present disclosure.

In a first aspect of the present disclosure, a method for managing a file system is provided. The method comprises causing multiple data blocks to be written to a storage space of the file system, the size of each of the multiple data blocks being not lower than a threshold size, and creating at least one space fragment in the storage space, the size of each of the at least one space fragment not exceeding the threshold size.

In a second aspect of the present disclosure, an electronic device is provided. The device comprises at least one processing unit and at least one memory. The at least one memory is coupled to the at least one processing unit and stores instructions for execution by the at least one processing unit. The instructions, when executed by the at least one processing unit, cause the device to perform actions comprising: causing multiple data blocks to be written to a storage space of a file system, the size of each of the multiple data blocks being not lower than a threshold size; and creating at least one space fragment in the storage space, the size of each of the at least one space fragment not exceeding the threshold size.

In a third aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

The summary is provided in order to introduce a selection of concepts in an illustrative form, which will be further illustratively described in the detailed description below. The summary is not necessarily intended to identify each and every key feature or essential feature of the present disclosure, nor is it intended to limit the scope of the present disclosure.

BRIEF DESCRIPTION OF THE DRAWINGS

The above and other objects, features, and advantages of the present disclosure will become more apparent by describing the example embodiments of the present disclosure in more detail in combination with the accompanying drawings. In the example embodiments of the present disclosure, the same reference numerals generally represent the same parts. In the accompanying drawings.

The same or corresponding reference numerals in the accompanying drawings represent the same or corresponding parts.

DETAILED DESCRIPTION

Figure 1:
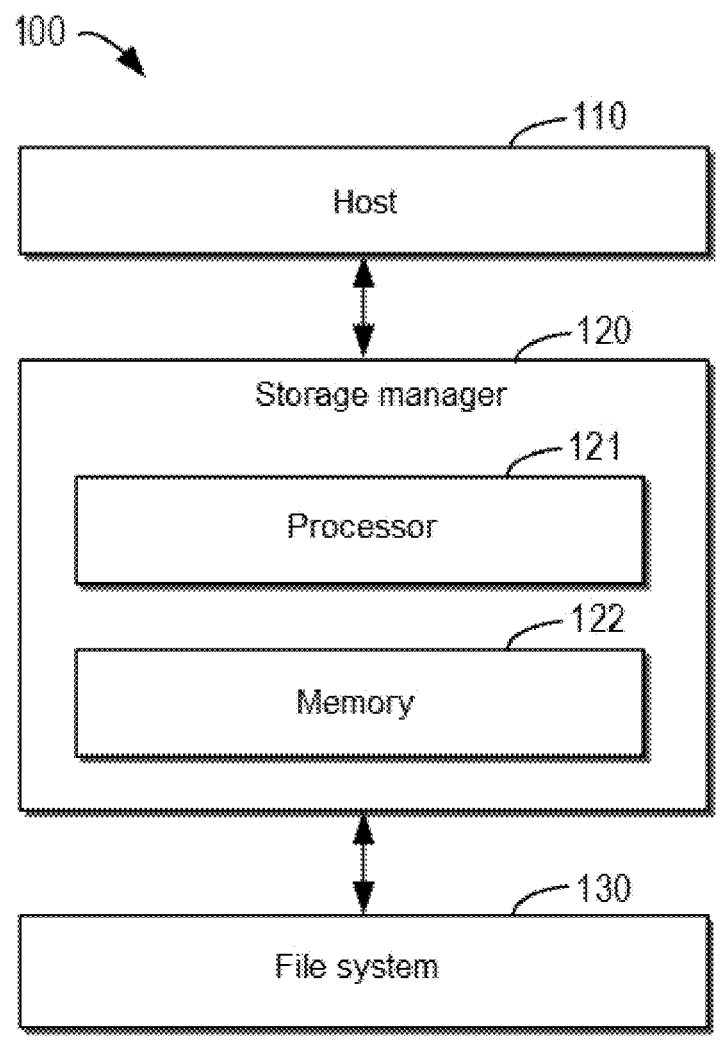
FIG. 1 illustrates a schematic diagram of an example environment in which embodiments of the present disclosure may be implemented.

Hereinafter, illustrative embodiments of the present disclosure will be described in more detail with reference to the accompanying drawings. Although illustrative embodiments of the present disclosure are shown in the drawings, it should be understood that the present disclosure can be implemented in various forms and should not be limited by the embodiments set forth herein. Rather, these embodiments are provided so that the present disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" indicates "and/or." The term "based on" means "based at least in part on." The terms "one example embodiment" and "one embodiment" mean "at least one example embodiment." The term "another embodiment" means "at least one further embodiment." The terms "first," "second," etc., may refer to different or the same objects. Other explicit and implicit definitions may also be included below.

Generally speaking, a file system has its own life cycle. An end user creates, reads, writes, truncates, deletes, and copies files, directories, and links in a file system. The file system can be migrated or copied from one place to another. A snapshot of the file system can be taken, resulting in block sharing and write splitting. Sometimes the file system may go offline or be damaged. FSCK (the FSCK is used to check and maintain an inconsistent file system, and if the system is powered off or the magnetic disk has a problem, an FSCK command can be used to check the file system) can be executed to recover the file system. From the perspective of an end user and storage implementation of the file system, there are many factors that cause the aging of the file system, including but not limited to the following: fragmentation, cumulative operations, reuse of data structures (e.g., inodes, indirect blocks, etc.), reuse of resources (e.g., index node numbers), redistribution of data blocks, recovery from failures (e.g., offline) FSCKs, etc.

Conventionally, stress tests, endurance tests, data migration tests, customer upgrading tests, etc. are performed on newly created file systems, but they do not reveal potential problems and performance bottlenecks in a file system, especially after aging of a storage space in the file system.

In order to at least partially solve the above problems and one or more of other potential problems, a solution for managing a file system is proposed in the example embodiments of the present disclosure. In this solution, firstly, data is written in multiple storage subspaces of a storage space of the file system. Then, operations are performed on the written data to generate space fragments, thereby aging the file system. In this way, this solution can simulate, in a short time, a customer file system that has been used for a long time, which helps to reveal potential problems in a newly designed file system and can identify performance bottlenecks of the file system, thereby improving the test efficiency and effectiveness of subsequent tests.

Hereinafter, specific examples of this solution will be described in more detail with reference to FIGS. 1 to 14.

FIG. 1 illustrates a schematic diagram of an example of a backup system according to an embodiment of the present disclosure. FIG. 1 illustrates a block diagram of example environment 100 in which the embodiments of the present disclosure can be implemented. As shown in FIG. 1, environment 100 includes host 110, storage manager 120, and file system 130. It should be understood that the structure and functions of environment 100 are described for illustrative purpose only and do not imply any limitation to the scope of the present disclosure. For example, embodiments of the present disclosure may also be applied to an environment different from environment 100.

File system 130 may include one or more storage spaces, such as magnetic disks, optical disks, hard drive disks (HDDs), or solid state disks (SSDs). Each storage space can be divided into multiple storage subspaces. For example, each of the storage subspaces may have the same size. According to different types of stored data or according to divided logical layers, file system 130 may include various types of storage spaces, for example, a storage space for storing user data (also called a "user data storage space"), a storage space for storing metadata related to a storage system (also called a "metadata storage space"), etc. The metadata storage space may store mapping information, index information, state information, etc., related to the storage system, such as mapping information from storage spaces to physical disks and states of the storage spaces (such as normal states or failure states). Data stored in the multiple storage subspaces in the storage space may be correlated with each other.

Storage manager 120 may include processor 121 and memory 122. Memory 122 may be any volatile storage medium, non-volatile storage medium, or a combination thereof, which is currently known or to be developed in the future. Storage manager 120 may be configured to manage file system 130 and process input/output (I/O) requests from host 110. Host 110 may be any physical computer, virtual machine, server, etc., running user applications.

Host 110 may send an I/O request to storage manager 120, for example, for removing data from and/or writing data to the storage space in file system 130. Metadata of a target storage space may be stored in the metadata storage space. In response to receiving the I/O request from host 110, storage manager 120 may first acquire the metadata of the target storage space from the metadata storage space, wherein the metadata may indicate mapping information from the target storage space to a physical disk, a state of the target storage space, etc. In response to the I/O request being a read request, storage manager 120 may forward the I/O request to the target storage space based on the acquired metadata so as to read data from the target storage space, and return the read data to host 110. In response to the I/O request being a write request, storage manager 120 may forward the I/O request to the target storage space based on the acquired metadata so as to write data to the target storage space.

Figure 2:
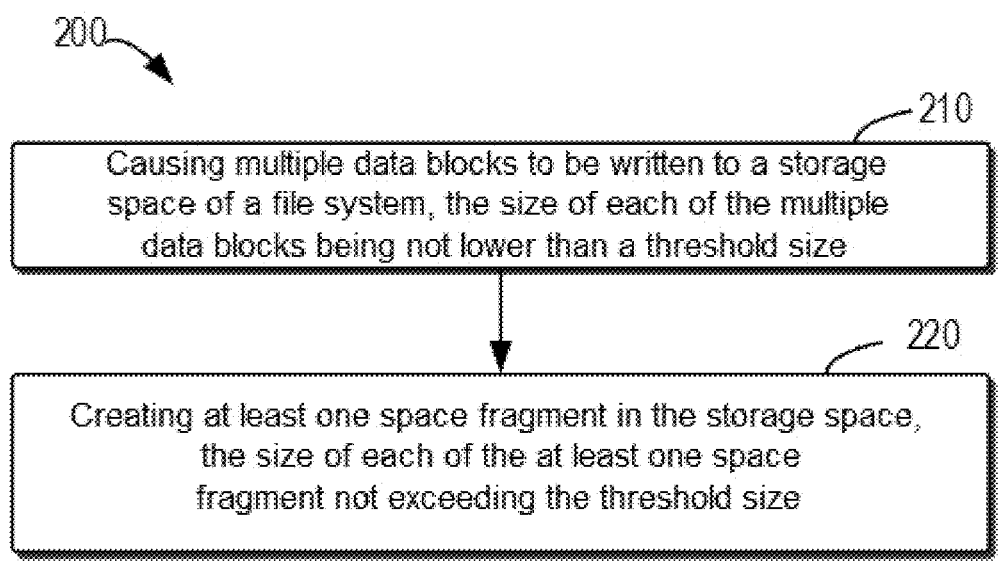
FIG. 2 illustrates a flowchart of a method for managing a file system according to an embodiment of the present disclosure.

FIG. 2 illustrates a flowchart of example method 200 for managing a storage disk according to an embodiment of the present disclosure. Method 200 may be executed, for example, by storage manager 120 as shown in FIG. 1. It should be understood that method 200 may further include additional actions not shown and/or may omit actions shown, and the scope of the present disclosure is not limited in this regard. Method 200 is described in detail below with reference to FIG. 1.

As shown in FIG. 2, at block 210, storage manager 120 causes multiple data blocks to be written to a storage space of file system 130, the size of each of the multiple data blocks being not lower than a threshold size. For example, storage manager 120 may write data blocks of the same or different sizes to multiple storage subspaces in the storage space of file system 130 in response to a write request initiated by host 110. Here, the threshold size may be the minimum storage subspace size of file system 130, for example, 8 KB. Note that, for different file systems, the minimum storage space sizes can be different, so different threshold sizes can be set, and the present disclosure is not limited in this regard.

At block 220, storage manager 120 creates at least one space fragment in storage space of file system 130, with the size of each of the at least one space fragment not exceeding the threshold size. For example, storage manager 120 may perform, in response to an erasure request or a rewrite request initiated by host 110, operations such as removing, changing the compression rate, and rewriting on multiple data blocks that are written in step 210 to multiple storage subspaces in the storage space of file system 130, so as to create multiple space fragments in the file system. Here, the space fragments refer to discontinuous spaces in the multiple storage subspaces in the storage space, wherein the space is, for example, less than the minimum storage space size, and data cannot be written directly to it.

The above steps 210 and 220 will be described in detail below with reference to FIGS. 3 to 7.

Figure 3:
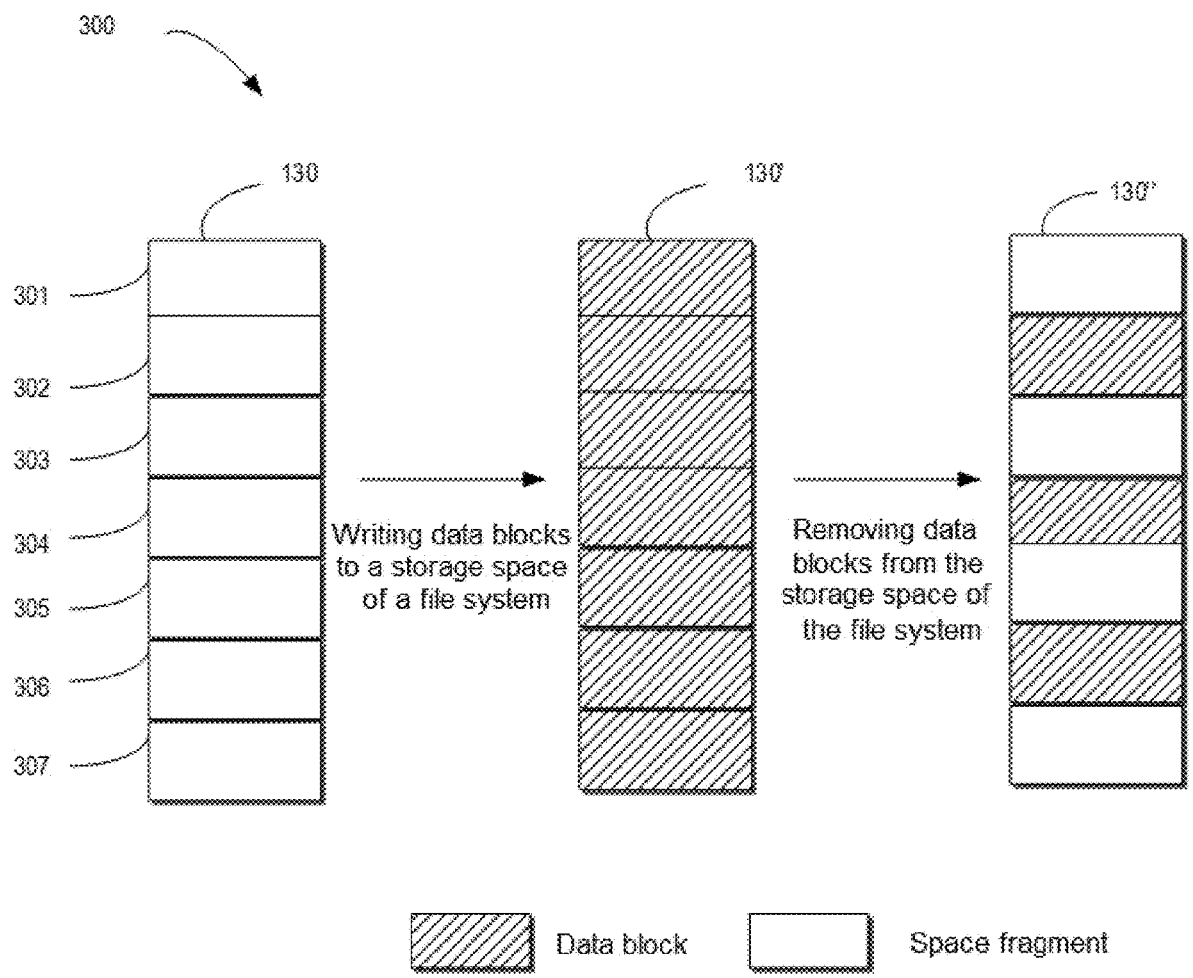
FIG. 3 illustrates a schematic diagram of managing a file system according to an embodiment of the present disclosure.

FIG. 3 illustrates schematic diagram 300 of managing a file system according to an embodiment of the present disclosure. Storage manager 120 causes multiple data blocks to be written to subspaces 301, 302, 303, 304, 305, 306, and 307 of the storage space of file system 130. Here, the multiple subspaces can be new blank storage spaces, and the present disclosure is not limited in this regard. As shown in 130' in the figure, the multiple written data blocks each occupy a subspace in the storage space. Then, storage manager 120 causes at least two of the multiple written data blocks to be removed from the storage space. For example, as shown in 130", blank rectangular frames represent the subspaces occupied by the removed data blocks, that is, space fragments, and the subspaces occupied by the shown data blocks in the storage space before being removed are not adjacent. As a result, the space fragments as shown by the blanks in 130" are created, and the spaces occupied by the space fragments are not larger than the size of the written data block and are not adjacent.

In one embodiment, storage manager 120 writes data blocks of the same size (for example, 8 KB, where 8 KB is the minimum storage subspace size) to storage space of file system 130 via an I/O tool, and then it removes the written data blocks at intervals, and disables a space reclamation function such as FSR in the process of the removing, wherein the space reclamation function prohibits the recombination of the blank storage subspaces, thus achieving a higher fragmentation rate. Note that the 8 KB data blocks of the same size are only illustrative.

A large number of 8 KB data blocks can also help configure a complex file structure, such as the level 3 DUCH.

In an example, the writing of the above 8 KB data blocks can be implemented by an FIO tool. FIO is an I/O test tool that supports multi-engine and multi-system tests, and is just used as an example here. An internal tool such as one developed by an internal team, or an external tool such as an LDX tool can be used to implement the writing or removing of data, and the present disclosure is not limited in this regard. The code of the FIO tool to implement the writing of the 8 KB data blocks can refer to the following, where the file can be the data blocks in the above process:

```
[global]
do_verify=0
ioengine=libaio
iodepth=32
direct=1
readwrite=write
openfiles=40
refill_buffers=0
numjobs=1
create_on_open=1
bs=8k
[_mnt_testAged_2] \The name of the created files\
directory=/mnt/obd2151/afp01/ \Load a pointer\
filesize=8k \The size of the created files\
nrfiles=65536 \The number of the created files, if the number is too large, the host will run out of memory\
create_serialize =1 \If set, it will have a very high fragmentation rate,
but it will take more time to create files\
```

The above code is only illustrative and is not intended to limit the present disclosure.

The situation described above is where there is no compression of data blocks or duplicate storage of data blocks. Data compression and duplicate-data deletion are commonly used functions to improve storage efficiency, and are widely used in file systems. Hereinafter, the situation of the file system that supports data compression and duplicate-data deletion will be further described in combination with FIGS. 4 to 7.

Figure 4:
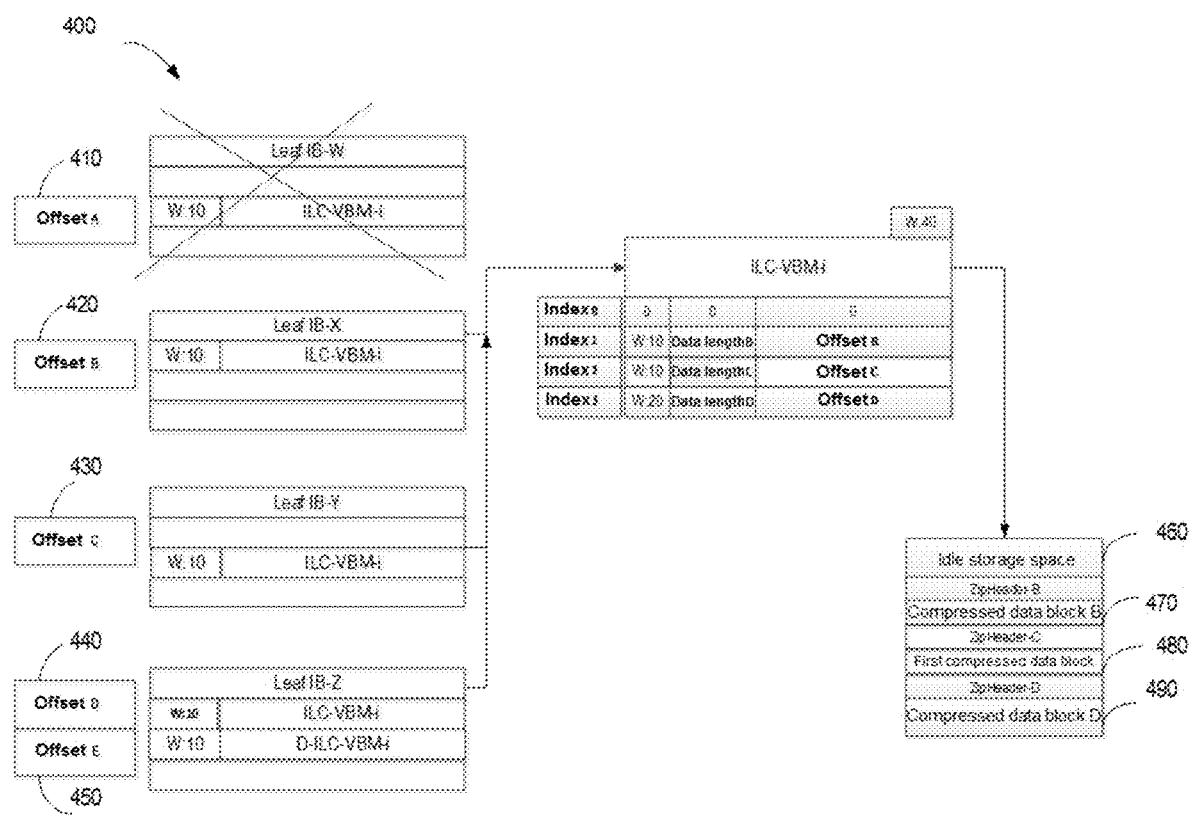
FIG. 4 illustrates a schematic diagram of an environment for managing a file system according to an embodiment of the present disclosure.

FIG. 4 illustrates schematic diagram 400 of an environment for managing a file system according to an embodiment of the present disclosure. In response to receiving an I/O request from host 110, storage manager 120 may first acquire metadata Leaf IB-W, Leaf IB-X, Leaf IB-Y, and Leaf IB-Z from a metadata storage space, wherein Leaf IB-X, Leaf IB-Y, and Leaf IB-Z respectively correspond to compressed data block B 470, compressed data block C (for the convenience of subsequent description, it is referred to as first compressed data block 480 in the figure and below), compressed data block D 490, and compressed data block A corresponding to Leaf IB-W is being removed. The multiple pieces of metadata may indicate mapping information from storage spaces to physical disks, a state of the target storage space, etc., and the multiple pieces of metadata may be further indexed to metadata ILC-VBM-i via offset A 410, offset B 420, offset C 430, offset D 440, and offset E 450, wherein this metadata is metadata of the VBM type, and ILC means that it can store compressed data. This is just an example, other types of data or metadata can also be used, data can also be named in other ways, and the present disclosure is not limited in this regard.

Take index 1 in metadata ILC-VBM-i as an example, where W:10 indicates that the weight of metadata Leaf IB-X among all metadata stored in metadata ILC-VBM-i is 10, and data length B indicates the data length of compressed data block B 470, which corresponds to metadata data Leaf IB-X, in the storage space, wherein metadata Leaf IB-Z stores two pieces of identical compressed data of which the corresponding data weight is 20, and of which the corresponding data only occupies one word storage space in the data storage space, that is, the compressed data block D 490 storage space. With different weights of different data, it can be quickly determined which data has a problem. Zipheader-B, Zipheader-C, and Zipheader-D represent address information of the stored compressed data block B 470, first compressed data block 480, and compressed data block D 490. Compressed data block A (not shown) corresponding to metadata Leaf IB-W is removed from the storage space of file system 130. The cross shape on Leaf IB-W in FIG. 4 indicates that it has been removed. Therefore, its weight, length, and offset in index 0 in metadata ILC-VBM-i are 0, and because it is removed, there exists idle storage space 460 in the storage space. Compressed data block A being removed is only to describe the embodiments of the present disclosure, and it is not intended to be limiting. In the following description, metadata will not be repeated, and operations by storage manager 120 on data blocks in the storage space will be directly described.

Figure 5:
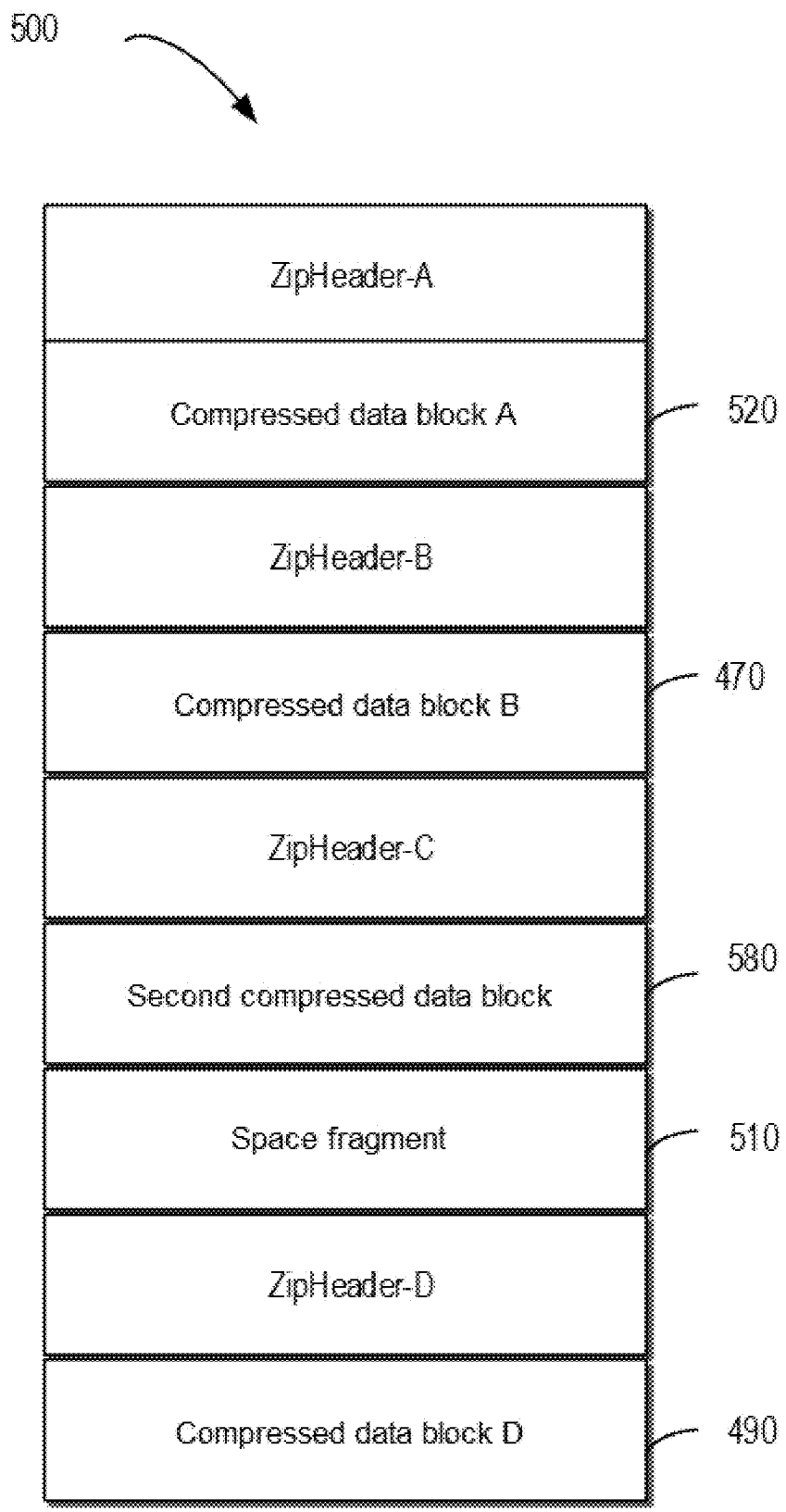
FIG. 5 illustrates a schematic diagram of managing a file system according to an embodiment of the present disclosure.

FIG. 5 illustrates schematic diagram 500 of managing a file system according to an embodiment of the present disclosure. Referring first to the above description with reference to FIG. 4, storage manager 120 may compress a first data block of the multiple data blocks at a first compression rate in response to a write request of host 110 so as to obtain first compressed data block 480, and write it to a first subspace in the storage space of file system 130. The writing process can refer to the description in FIG. 4, which will not be repeated here. The first subspace, the second subspace, etc., described later are multiple storage subspaces in the storage space of file system 130, which may be storage spaces of the same size or different sizes, and the present disclosure is not limited herein.

For example, storage manager 120 may obtain first compressed data block 480 with a size of 6.4 KB from the first data block of 8 KB through the first compression rate of 80%, and then write it to the first subspace. Here, the first subspace correspondingly occupies a storage space of 6.4 KB in the storage space. The size and compression rate of the above data block are only illustrative, and other data sizes and compression rate values can also be applied according to different storage and data structures.

Then, storage manager 120 may cause the first compressed data block to be removed from the first subspace. For example, storage manager 120 may remove Offset-C 430 corresponding to this first compressed data block 480, and then first compressed data block 480 is removed from the first subspace and metadata ILC-VBM-i for Offset-C 430 is removed and the first subspace is released. Then storage manager 120 recompresses the first data block by a second compression rate greater than the first compression rate to obtain second compressed data block 580. Since the first compression rate is less than the second compression rate, the size of second compressed data block 580 is less than that of first compressed data block 480, so storage manager 120 can rewrite second compressed data block 580 to the first subspace, thereby generating space fragment 510.

For example, continuing with the description of the above example, storage manager 120 can obtain second compressed data block 580 with a size of 5.6 KB from the first data block of 8 KB through the second compression rate of 70%, then storage manager 120 can write second compressed data block 580 of 5.6 KB to the first subspace in the storage space, and data length C is updated to 5.6 KB, thereby creating space fragment 510 with a size of 6.4 KB−5.6 KB=0.8 KB. Herein, the space fragment refers to a separate storage space, which can no longer store data without space reclamation operations.

In an alternative embodiment, the first compression rate may be 100%, that is, the first data block is not compressed, and the second compression rate may be any compression rate less than 100%, thereby creating an idle storage space.

Similar operations can also be performed on the aforementioned compressed data block B and compressed data block D, which will not be repeated here.

By repeatedly compressing the same data block or different data blocks at different compression rates multiple times, space fragments that is, for example, 10% or less of the minimum storage space can be created. Data cannot be further written to these space fragments, thereby aging the file system. In addition, rewriting IOs at different data compression rates can trigger the write splitting of data blocks. In the case where the original metadata is not the same as the stored compressed data block, it may also result in the increase and deletion of metadata related to the implementation of data block sharing, thereby further aging the file system.

Figure 6:
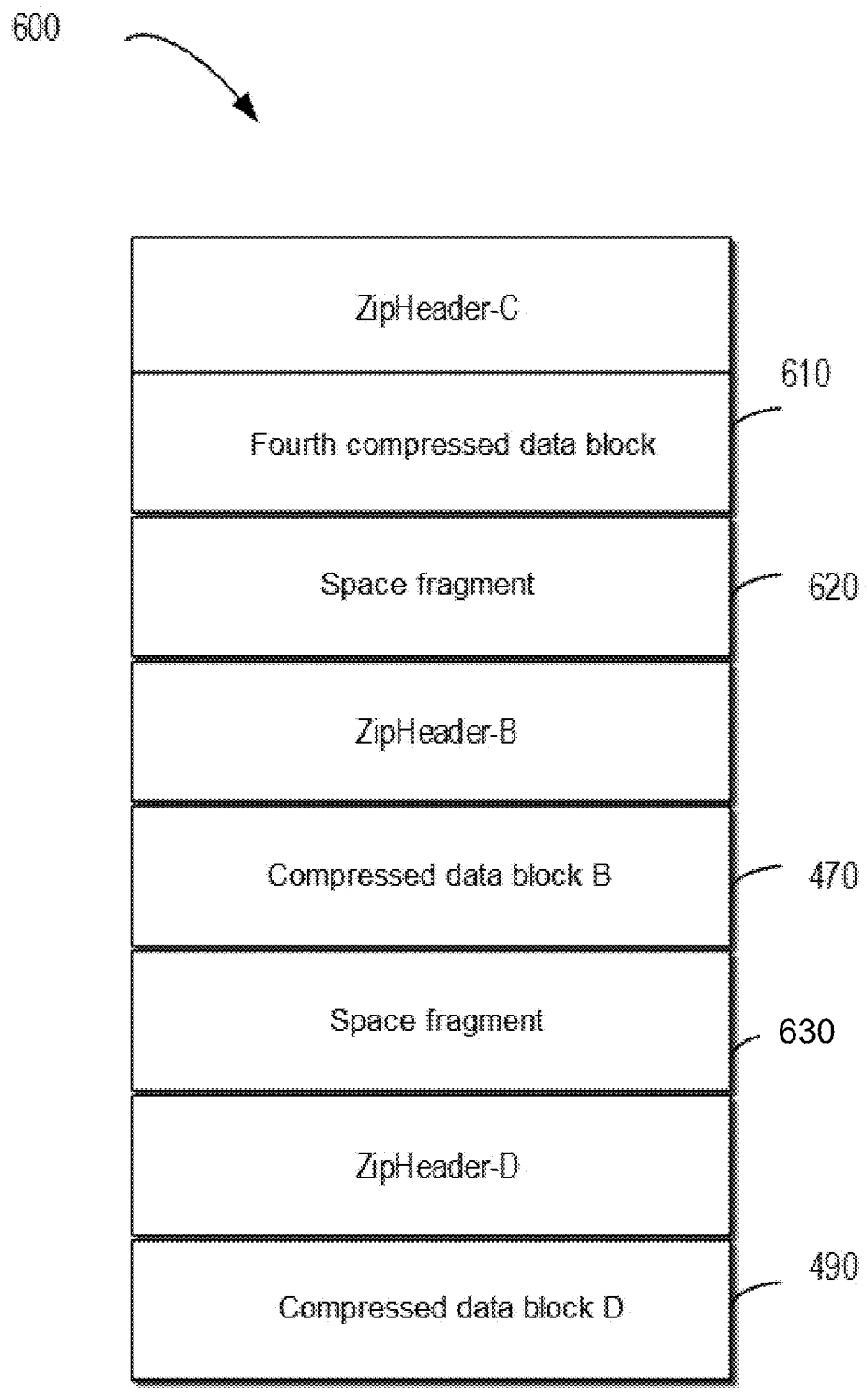
FIG. 6 illustrates a schematic diagram of managing a file system according to an embodiment of the present disclosure.

FIG. 6 illustrates schematic diagram 600 of managing a file system according to an embodiment of the present disclosure. The difference between FIG. 6 and FIG. 5 is that the rewritten compressed data block has a larger size than the originally written compressed data block, so it cannot be written to the originally occupied storage space. Storage manager 120 first performs multiple write operations in response to multiple write requests from host 110. Storage manager 120 causes a second data block of the multiple data blocks to be written to a second subspace in the storage space, and then compresses a third data block of the multiple data blocks at a third compression rate to obtain a third compressed data block, and causes the third compressed data block to be written to a third subspace in the storage space, the size of the second data block being greater than that of the third data block, and the second subspace and the third subspace being not adjacent.

For example, the description is first given with reference to FIG. 5, where storage manager 120 can first write compressed data block A 520 of 8 KB to the second subspace in the storage space of file system 130, and then can compress the 8 KB third data block at the third compression rate of 70% to obtain the third compressed data block (shown as the second compressed data block in the figure) with a size of 5.6 KB, and then storage manager 120 can write the third compressed data block of 5.6 KB to the third subspace in the storage space. As shown in the figure, there also exists compressed data block B 470 between compressed data block A 520 and the third subspace.

Then, storage manager 120 causes the second data block to be removed from the second subspace, causes the third compressed data block to be removed from the third subspace, compresses the third data block at a fourth compression rate that is less than the third compression rate to obtain a fourth compressed data block, and finally causes the fourth compressed data block to be written to the second subspace.

For example, storage manager 120 can remove compressed data block A 520 of 8 KB from the second subspace in the storage space of file system 130. As shown in FIG. 4, all data in the VBM metadata are updated to 0 after the removing, and then the third compressed data block of 5.6 KB is removed from the third subspace. Storage manager 120 obtains fourth compressed data block 610 with a size of 7.2 KB through a fourth compression rate of 90%. Since fourth data block 610 has a larger size than the third subspace, i.e., the size of 5.6 KB of the third compressed data block, it cannot be written to the third subspace. Since the size of the second subspace, i.e., the size of 8 KB of compressed data block A 520, is larger than that of fourth data block 610, storage manager 120 can write fourth compressed data block 610 of 7.2 KB to the second subspace in the storage space, and data length C is updated to 7.2 KB.

Thus, as shown in FIG. 6, space fragment 620 with a size of 8 KB−7.2 KB=0.8 KB and space fragment 630 with a size of 5.6 KB are created.

In an alternative embodiment, since metadata ILC-VBM-i can store 12 (the number 12 is illustrative, and it only represents the attributes of different types of metadata) corresponding compressed data entries, if metadata ILC-VBM-i have no suitable block to store the newly written compressed data, a new metadata VBM should be created to store the compressed data.

Regarding the foregoing description of creating various space fragments by writing and removing compressed data, the following describes the case of duplicate data.

Figure 7:
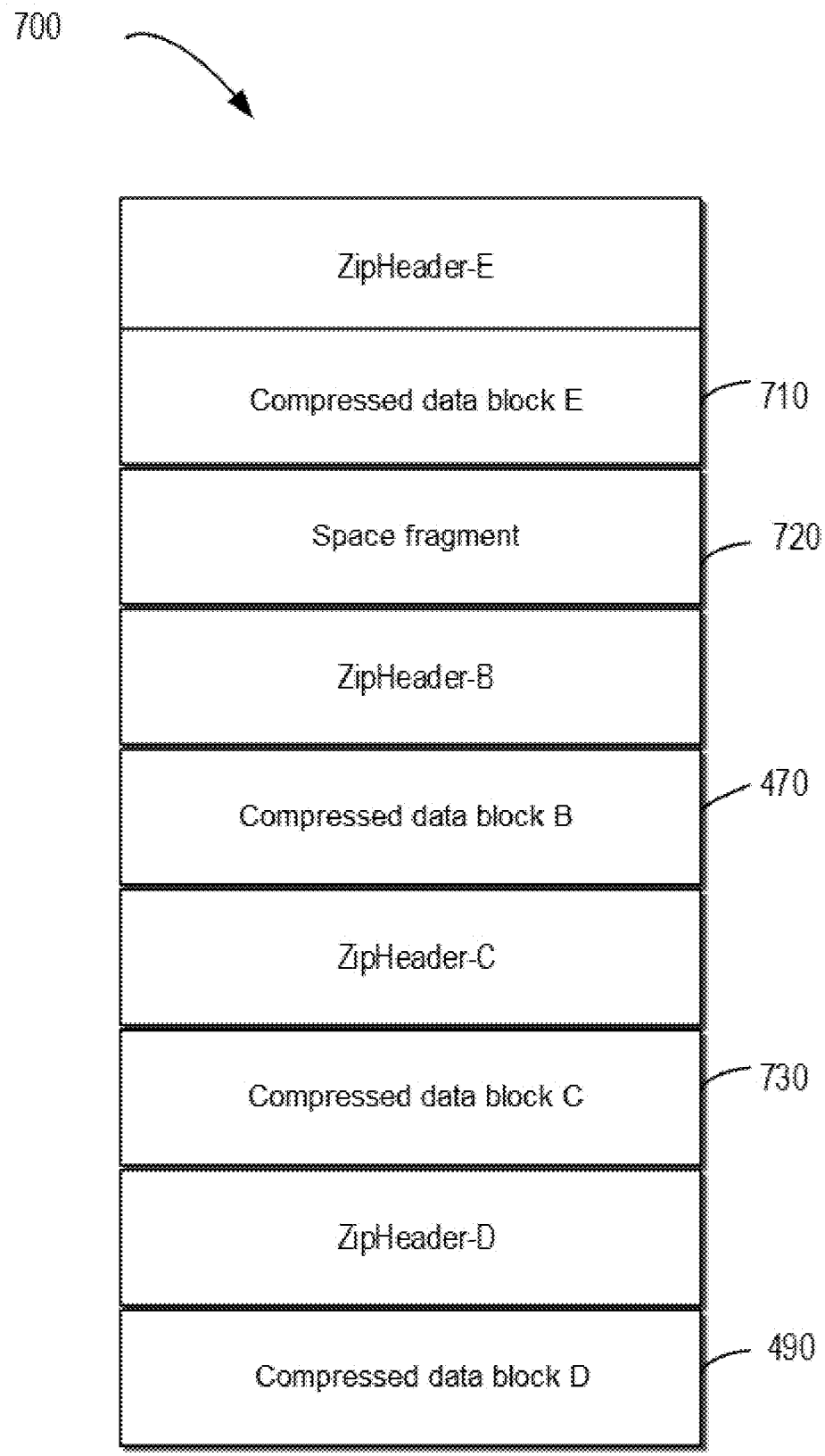
FIG. 7 illustrates a schematic diagram of managing a file system according to an embodiment of the present disclosure.

FIG. 7 illustrates schematic diagram 700 of managing a file system according to an embodiment of the present disclosure. As discussed above with respect to FIG. 4, Offset-D 440 and Offset-E 450 are duplicate data, which share one data block. Storage manager 120 rewrites Offset-E 450 at different compression rates/duplicate-data deleting rates, thus resulting in that Offset-D 440 and Offset-E 450 cannot share one data block. Write splitting must be performed on Offset-E 450, that is, rewriting the recompressed data block. The writing process is similar to the rewriting of Offset-C 430 described above in FIGS. 5 to 7, and will not be repeated here. Storage manager 120 also adds a new record related to Offset-E 450 in ILC-VBM-i, such as its weight and length.

As shown in FIG. 7, compressed data block E 710 rewritten at a different compression rate occupies the storage space occupied by the previously removed compressed data block A 520, thereby creating space fragment 720.

In an embodiment, storage manager 120 may also perform the operations described above, such as compression and rewriting, on compressed data block B 470 and compressed data block C 730 to create more space fragments.

In an alternative embodiment, the simultaneous performing of the above write and removing operations on data blocks can result in I/O snapshot creation/deleting operations with different file sizes and create more space fragments. These operations can test more metadata areas, such as inode (e.g., inode cache, reuse of inode ID with a generated number), and accelerate the aging of the file system.

Figure 8:
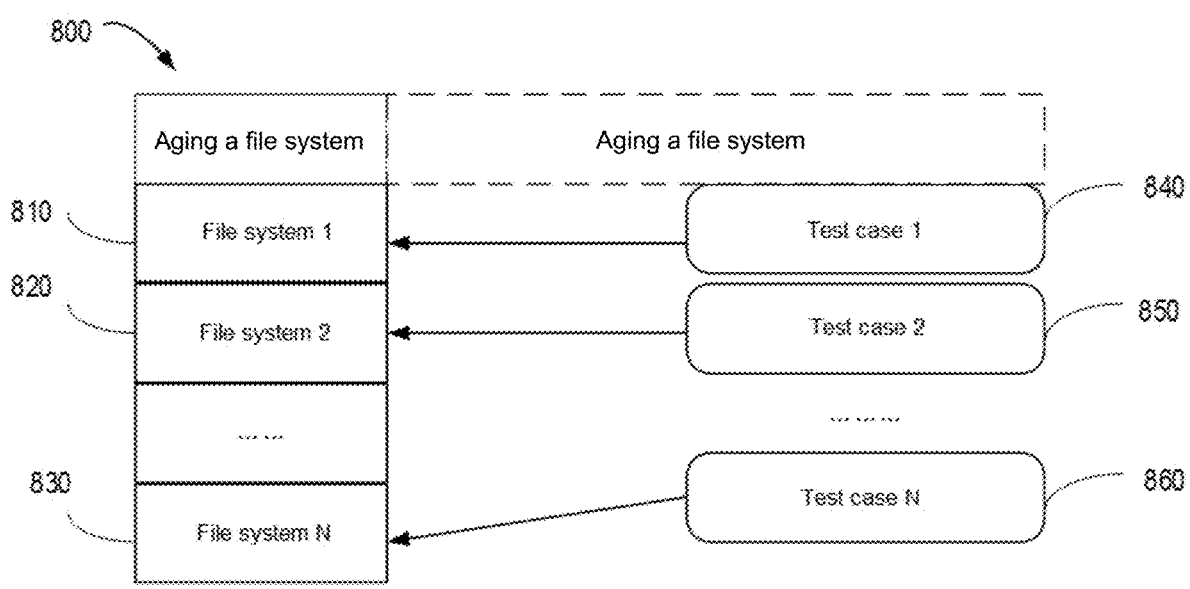
FIG. 8 illustrates a schematic diagram of performing a test on an aged file system according to an embodiment of the present disclosure.

FIG. 8 illustrates schematic diagram 800 of performing a test on an aged file system according to an embodiment of the present disclosure. File system 1 (810), file system 2 (820) to file system N (830) can be aged through the space fragment creation operations described above with respect to FIGS. 2 to 7. Test case 1 (840), test case 2 (850), and test case N (860) may include, for example, unit test, functional test, integration test, stress test, and endurance test. There may be two ways to perform aging and testing of the file system. Solution I (as shown by the solid line): storage manager 120 may first age multiple file systems, and then test the aged file systems through multiple test cases. Solution II (as shown by the dotted line): storage manager 120 may test a file system while aging it.

Figure 9:
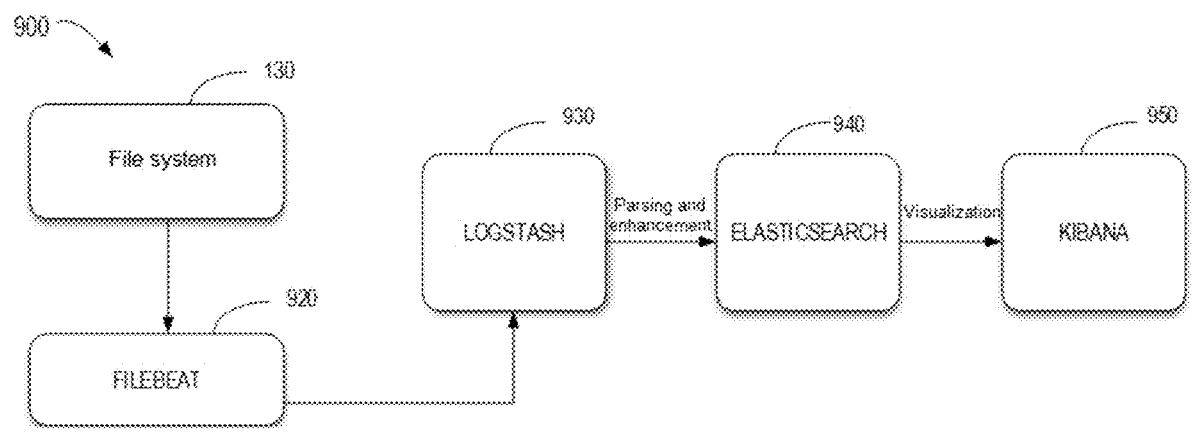
FIG. 9 illustrates a schematic diagram of a device for recording a process of managing a file system according to an embodiment of the present disclosure.
Figure 10:
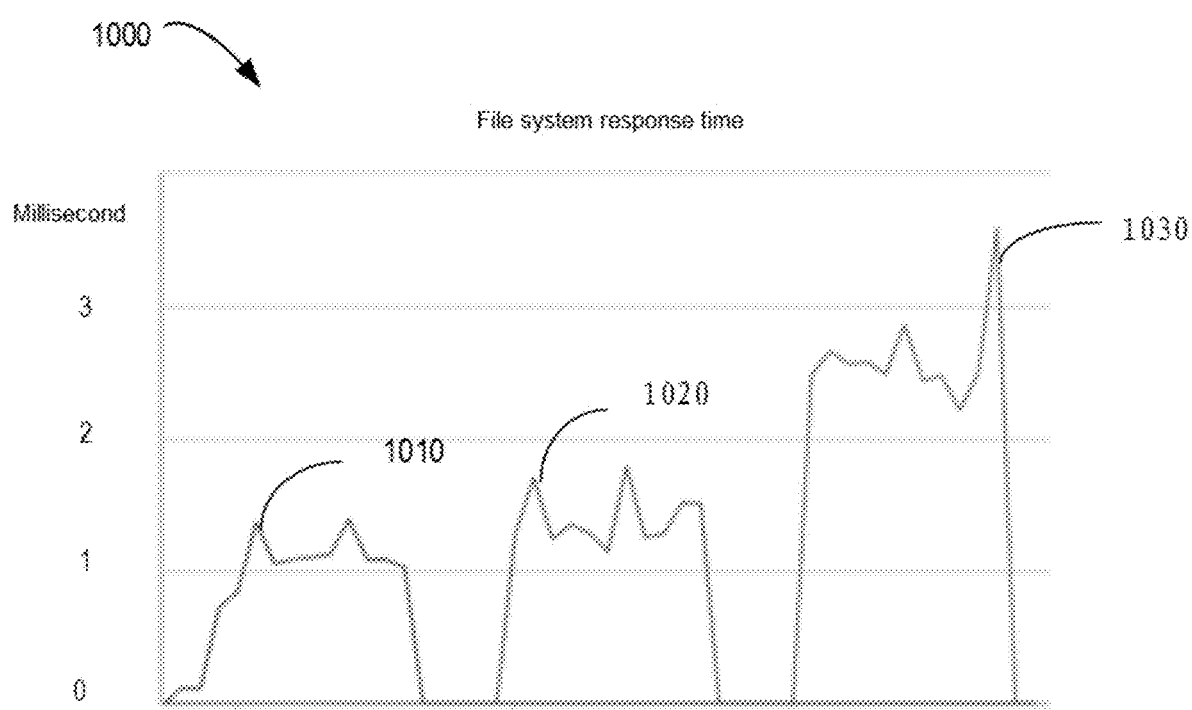
FIG. 10 illustrates a schematic diagram of the performance of a file system according to an embodiment of the present disclosure.
Figure 11:
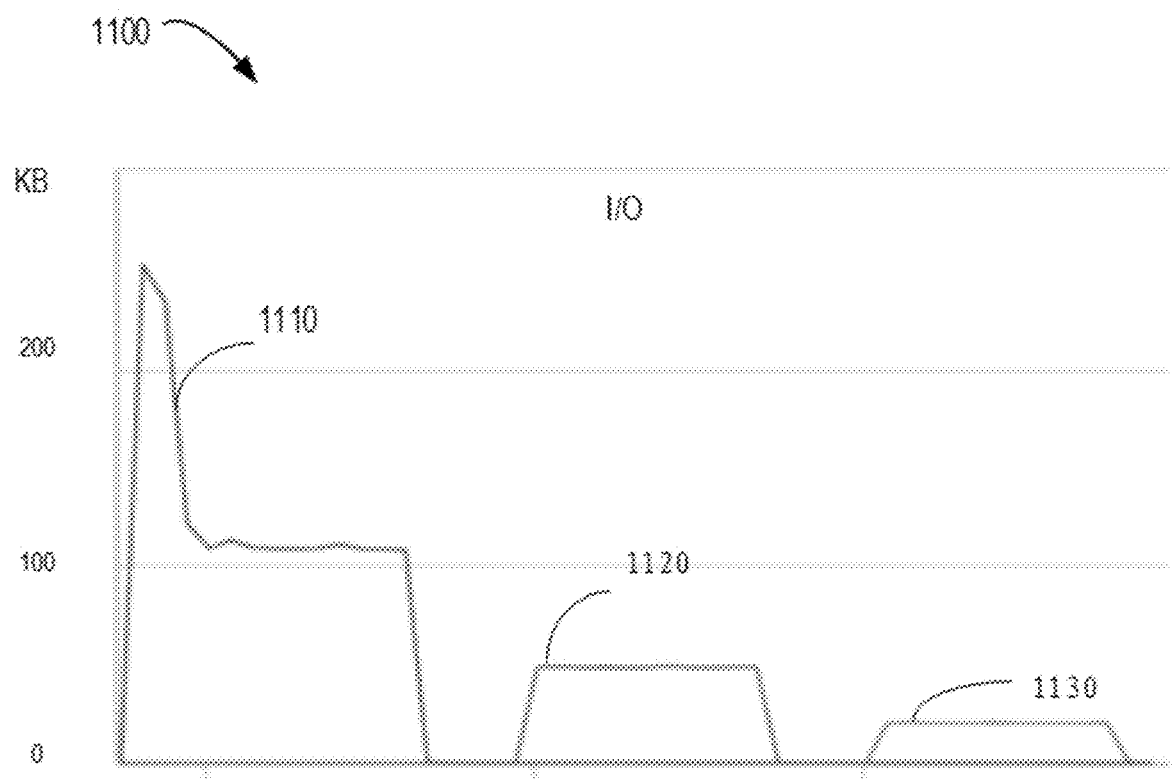
FIG. 11 illustrates a schematic diagram of the performance of a file system according to an embodiment of the present disclosure.
Figure 12:
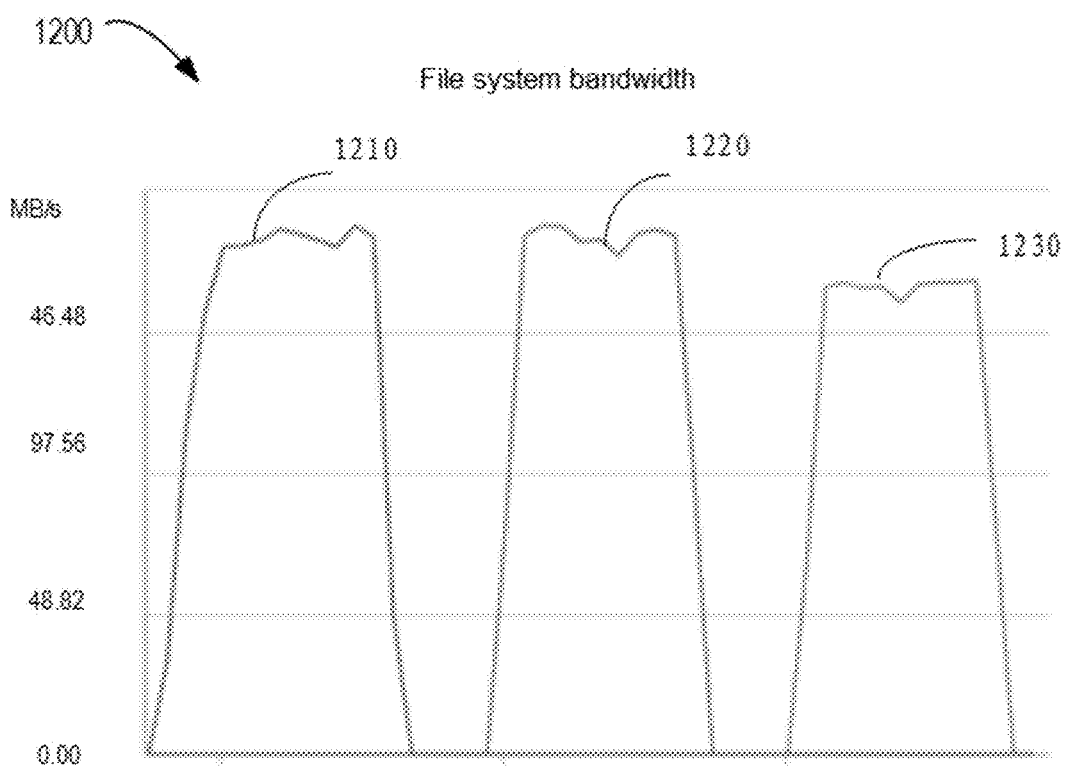
FIG. 12 illustrates a schematic diagram of the performance of a file system according to an embodiment of the present disclosure.
Figure 13:
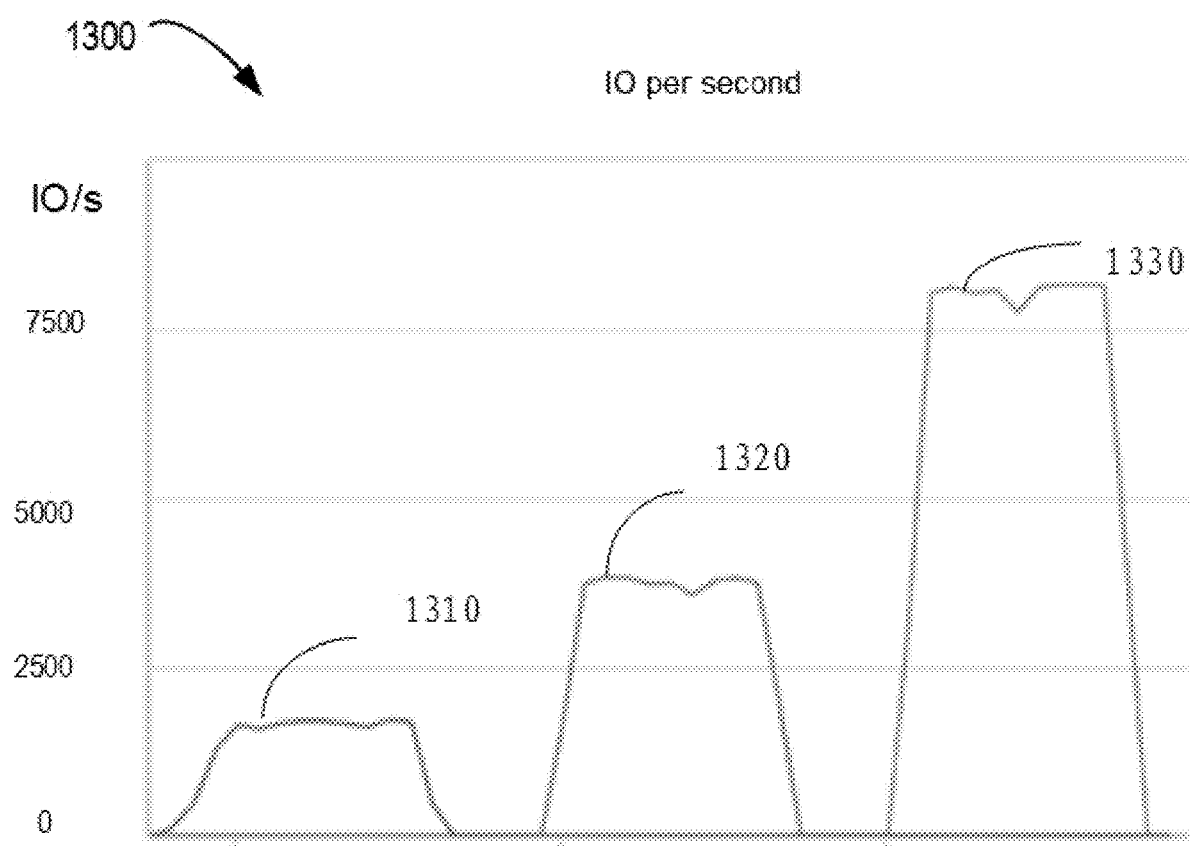
FIG. 13 illustrates a schematic diagram of the performance of a file system according to an embodiment of the present disclosure.

FIG. 9 illustrates schematic diagram 900 of a device for detecting the aging process of a file system according to an embodiment of the present disclosure. The present disclosure proposes to use an Elastic Stack system to detect and record log traces and events during the aging process of file system 130. Filebeat 920 is a tool installed on the storage space of the file system to read target tracing, and to send data to Logstash 930 using a protocol sensitive to back pressure. Logstash 930 can extract and transform data, and then load it to Elasticsearch 940, wherein Elasticsearch 940 is the core software of Elastic core, which is used to record the log traces and events after the conversion. Finally, Kibana 950 will display detailed information about log traces in GUI, and it can tell the user when, where, and how the event occurred, as well as the feedback on the aging operations. The aging profile (workload and operation) will be modified based on the results obtained from the Elastic Stack.

For example, storage manager 120 may acquire data fragments, metadata fragments, free space fragments, and memory fragments of file system 130 via the aforementioned system to determine the aging rate of file system 130. Storage manager 120 may also acquire the frequencies of conflicting operations (block sharing, block reallocation, space reduction/expansion, etc.) and interrupt operations via the aforementioned system to determine the aging rate of file system 130.

In one embodiment, storage manager 120 may age file system 130 through the following steps: (1) firstly, configuring file system 130 using customer data on the memory and magnetic disk, wherein, for example, the customer data is pre-defined according to the data structure (hash table, DB, DUCH, dentry, etc.) frequently used by the customer, and whether it is a local file system or a global file system; (2) via a defined workload profile (I/O workload and file system operations), using internal tools and external (FIO, LDX) tools to age file system 130, wherein for the specific aging method, reference can be made to the method of creating fragments described in FIGS. 2 to 7; (3) monitoring and determining the aging rate of file system 130 via the Elastic Stack system; and (4) based on different testing purposes, continuously performing the operation of step (2) to obtain a preset aging rate.

FIGS. 10 to 13 illustrate schematic diagrams 1000, 1100, 1200, and 1300 of the performance of a file system according to embodiments of the present disclosure. Curves 1030, 1130, 1230, and 1330 indicate that a 50 GB file system is filled with 8 KB data blocks, and then the data blocks are deleted at intervals. It takes 15 hours to configure this file system. Curves 1020, 1120, 1220, and 1320 indicate that a 50 GB file system is filled with 16 KB data blocks, and then the data blocks are deleted at intervals. It takes 6 hours to configure this file system. Curves 1010, 1110, 1210, and 1310 represent newly created 50 GB file systems. It can be seen that the aging methods that use 8 KB data blocks and perform deletion at intervals, that is, curves 1030, 1130, 1230, and 1330, have the longest file system response time, the smallest I/O, the lowest bandwidth, and the highest I/O per second. That is to say, for this characteristic file system, the aging effect of filling with 8 KB data and deleting at intervals is the best. This example is merely illustrative, and small data blocks of different sizes can also be used for aging operations according to different file systems and data structures.

The above performance graphs are only illustrative. In one embodiment, storage manager 120 may also determine the performance of file system 130 by using at least one of the following: the response time of the file system, the average bandwidth of the file system to read/write data, the number of read and write operations performed by the file system per second, and the failure rate of the file system.

Figure 14:
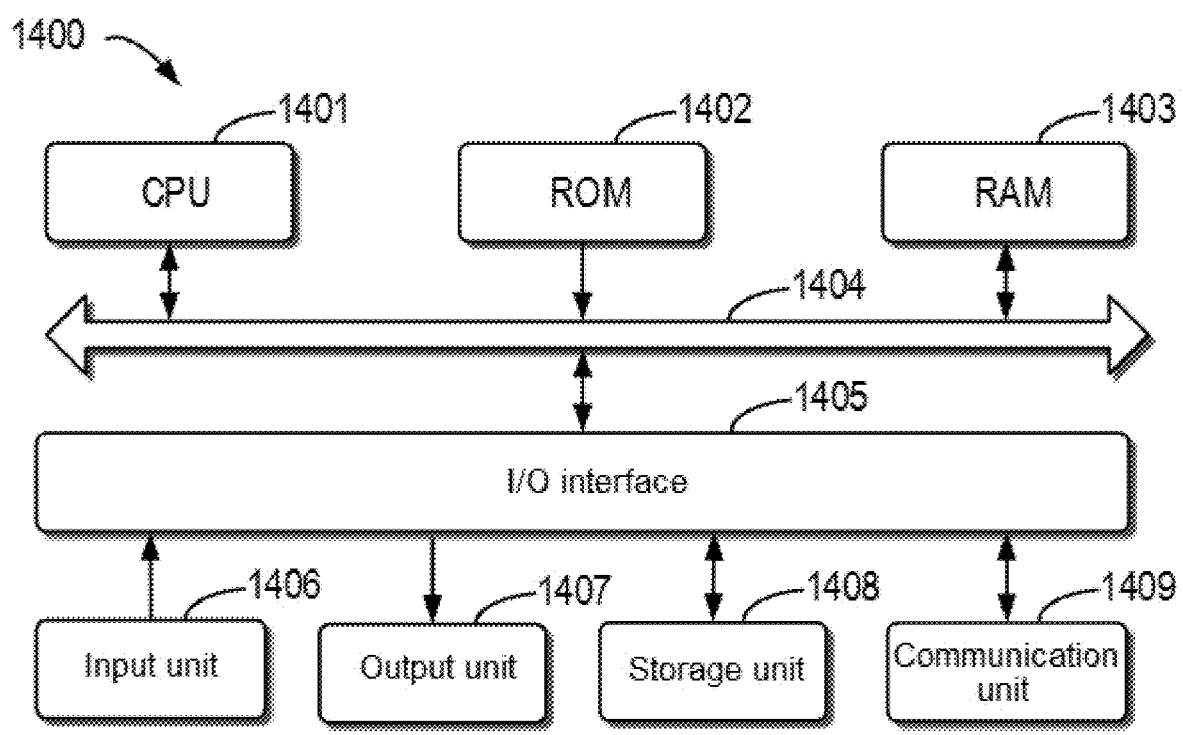
FIG. 14 illustrates a block diagram of an example device that can be used to implement embodiments of the present disclosure.

FIG. 14 illustrates a schematic block diagram of example device 1400 that can be used to implement the embodiments of the content of the present disclosure. For example, storage manager 120 as shown in FIG. 1 may be implemented by device 1400. As shown in the drawing, device 1400 includes central processing unit (CPU) 1401 that may perform various appropriate actions and processing according to computer program instructions stored in read-only memory (ROM) 1402 or computer program instructions loaded from storage unit 1408 to random access memory (RAM) 1403. In RAM 1403, various programs and data required for the operation of storage device 1400 may also be stored. CPU 1401, ROM 1402, and RAM 1403 are connected to each other through bus 1404. Input/output (I/O) interface 1405 is also connected to bus 1404.

Multiple components in device 1400 are connected to I/O interface 1405, including: input unit 1406, such as a keyboard and a mouse; output unit 1407, such as various types of displays and speakers; storage unit 1408, such as a magnetic disk and an optical disk; and communication unit 1409, such as a network card, a modem, and a wireless communication transceiver. Communication unit 1409 allows device 1400 to exchange information/data with other devices through a computer network such as the Internet and/or various telecommunication networks.

The various processes and processing described above, such as method 200, may be performed by CPU 1401. For example, in some embodiments, method 200 may be implemented as a computer software program that is tangibly included in a machine-readable medium such as storage unit 1408. In some embodiments, part or all of the computer program may be loaded and/or mounted to device 1400 via ROM 1402 and/or communication unit 1409. One or more actions of method 200 described above may be performed when the computer program is loaded to RAM 1403 and executed by CPU 1401.

The present disclosure can be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. The computer-readable storage medium may be, for example, but not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, RAM, ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or a server. In the case involving a remote computer, the remote computer can be connected to a user's computer through any kind of network, including a local area network (LAN) or a wide area network (WAN), or it can be connected to an external computer (for example, connected through an Internet using an Internet service provider). In some embodiments, the electronic circuit is personalized by utilizing the state information of the computer-readable program instructions, for example, a programmable logic circuit, a field programmable gate array (FPGA), or a programmable logic array (PLA), wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to embodiments of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing apparatus, or a further device, so that a series of operating steps can be performed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possibly implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to cause other persons of ordinary skill in the art to understand the various embodiments disclosed herein.

What is claimed is:

1. A method for managing a file system comprising:
    causing multiple data blocks to be written to a storage space of the file system, a size of each of the multiple data blocks being greater than or equal to a threshold size; and
    causing creation of space fragments in the storage space, the size of each of the space fragments not exceeding the threshold size, the space fragments comprising discontinuous spaces in the storage space;
    wherein the space fragments are created based on:
    repeatedly compressing a plurality of given written data blocks to a target size not exceeding the threshold size so that data cannot be further written to the created plurality of space fragments thereby aging the file system for performing a test of the aged file system through a plurality of test cases, wherein each of the repeated compressing is performed at a different compression rate;
    wherein the created plurality of space fragments do not comprise compressed data blocks; and
    wherein repeatedly compressing given written data blocks comprises:
    compressing a first data block of the multiple data blocks at a first compression rate to obtain a first compressed data block;
    writing the first compressed data block to a first subspace in the storage space;
    removing the first compressed data block from the first subspace;
    compressing the first compressed data block at a second compression rate to obtain a second compressed data block, the first compression rate being less than the second compression rate; and
    writing the second compressed data block to the first subspace to create a first space fragment.

2. The method according to claim 1, further comprising:
    writing a second data block of the multiple data blocks to a second subspace in the storage space;
    compressing a third data block of the multiple data blocks at a third compression rate to obtain a third compressed data block; and
    writing the third compressed data block to a third subspace in the storage space, the size of the second data block being greater than that of the third data block, and the second subspace and the third subspace being not adjacent.

3. The method according to claim 2, further comprising:
    removing the second data block from the second subspace;
    compressing the third compressed data block at a fourth compression rate to obtain a fourth compressed data block, the fourth compression rate being less than the third compression rate; and
    writing the fourth compressed data block to the second subspace.

4. The method according to claim 3, further comprising:
    causing the third compressed data block to be removed from the third subspace.

5. The method according to claim 1, further comprising:
    determining the performance of the file system after the space fragments are created, the performance including at least one of: a response time of the file system; an average bandwidth for the file system to read/write data; the number of read and write operations performed by the file system per second; and a failure rate of the file system.

6. An electronic device for managing a file system comprising:
    at least one processing unit; and
    at least one memory which is coupled to the at least one processing unit and stores instructions for execution by the at least one processing unit, wherein the instructions, when executed by the at least one processing unit, cause the electronic device to perform actions comprising:
    causing multiple data blocks to be written to a storage space of the file system, a size of each of the multiple data blocks being greater than or equal to a threshold size; and
    causing creation of space fragments in the storage space, the size of each of the space fragments not exceeding the threshold size, the space fragments comprising discontinuous spaces in the storage space;
    wherein the space fragments are created based on:
    repeatedly compressing a plurality of given written data blocks to a target size not exceeding the threshold size so that data cannot be further written to the created plurality of space fragments thereby aging the file system for performing a test of the aged file system through a plurality of test cases, wherein each of the repeated compressing is performed at a different compression rate;
    wherein the created plurality of space fragments do not comprise compressed data blocks; and
    wherein repeatedly compressing given written data blocks comprises:

compressing a first data block of the multiple data blocks at a first compression rate to obtain a first compressed data block;

writing the first compressed data block to a first subspace in the storage space;

removing the first compressed data block from the first subspace;

compressing the first compressed data block at a second compression rate to obtain a second compressed data block, the first compression rate being less than the second compression rate; and writing the second compressed data block to the first subspace to create a first space fragment.

7. The electronic device according to claim 6, wherein the size of each of the multiple data blocks is a preset size.

8. The electronic device according to claim 6, further comprising:

writing a second data block of the multiple data blocks to a second subspace in the storage space;

compressing a third data block of the multiple data blocks at a third compression rate to obtain a third compressed data block; and writing the third compressed data block to a third subspace in the storage space, the size of the second data block being greater than that of the third data block, and the second subspace and the third subspace being not adjacent.

9. The electronic device according to claim 8, further comprising:

removing the second data block from the second subspace;

compressing the third compressed data block at a fourth compression rate to obtain a fourth compressed data block, the fourth compression rate being less than the third compression rate; and writing the fourth compressed data block to the second subspace.

10. The electronic device according to claim 9, further comprising:

causing the third compressed data block to be removed from the third subspace.

11. The electronic device according to claim 6, further comprising:

determining the performance of the file system after the space fragments are created, the performance including at least one of: a response time of the file system; an average bandwidth for the file system to read/write data; the number of read and write operations performed by the file system per second; and a failure rate of the file system.

12. A computer program product tangibly stored in a non-transitory computer-readable medium and including machine-executable instructions for managing a file system, wherein the machine-executable instructions, when executed, cause a machine to perform steps of:

causing multiple data blocks to be written to a storage space of the file system, a size of each of the multiple data blocks being greater than or equal to a threshold size; and causing creation of space fragments in the storage space, the size of each of the space fragments not exceeding the threshold size, the space fragments comprising discontinuous spaces in the storage space;

wherein the space fragments are created based on:

repeatedly compressing a plurality of given written data blocks to a target size not exceeding the threshold size so that data cannot be further written to the created plurality of space fragments thereby aging the file system for performing a test of the aged file system through a plurality of test cases, wherein each of the repeated compressing is performed at a different compression rate;

wherein the created plurality of space fragments do not comprise compressed data blocks; and wherein repeatedly compressing given written data blocks comprises:

compressing a first data block of the multiple data blocks at a first compression rate to obtain a first compressed data block;

writing the first compressed data block to a first subspace in the storage space;

removing the first compressed data block from the first subspace;

compressing the first compressed data block at a second compression rate to obtain a second compressed data block, the first compression rate being less than the second compression rate; and writing the second compressed data block to the first subspace to create a first space fragment.

13. The computer program product according to claim 12, wherein the size of each of the multiple data blocks is a preset size.

14. The computer program product according to claim 12, further comprising:

writing a second data block of the multiple data blocks to a second subspace in the storage space;

compressing a third data block of the multiple data blocks at a third compression rate to obtain a third compressed data block; and writing the third compressed data block to a third subspace in the storage space, the size of the second data block being greater than that of the third data block, and the second subspace and the third subspace being not adjacent.

15. The computer program product according to claim 14, further comprising:

removing the second data block from the second subspace;

compressing the third compressed data block at a fourth compression rate to obtain a fourth compressed data block, the fourth compression rate being less than the third compression rate; and writing the fourth compressed data block to the second subspace.

16. The computer program product according to claim 15, further comprising:

causing the third compressed data block to be removed from the third subspace.

17. The computer program product according to claim 12, further comprising:

determining the performance of the file system after the space fragments are created, the performance including at least one of: a response time of the file system; an average bandwidth for the file system to read/write data; the number of read and write operations performed by the file system per second; and a failure rate of the file system.

18. The computer program product according to claim 12, further comprising:

compressing a third data block of the multiple data blocks at a third compression rate to obtain a fourth compressed data block;

writing the fourth compressed data block to a second subspace in the storage space;

removing the fourth compressed data block from the second subspace;

compressing the fourth compressed data block at a fourth compression rate to obtain a fifth compressed data block, the third compression rate being less than the fourth compression rate; and writing the fifth compressed data block to the second subspace to create a second space fragment.

19. The electronic device according to claim 6, further comprising:

compressing a third data block of the multiple data blocks at a third compression rate to obtain a fourth compressed data block;

writing the fourth compressed data block to a second subspace in the storage space;

removing the fourth compressed data block from the second subspace;

compressing the fourth compressed data block at a fourth compression rate to obtain a fifth compressed data block, the third compression rate being less than the fourth compression rate; and writing the fifth compressed data block to the second subspace to create a second space fragment.

20. The method according to claim 1, further comprising:

compressing a third data block of the multiple data blocks at a third compression rate to obtain a fourth compressed data block;

writing the fourth compressed data block to a second subspace in the storage space;

removing the fourth compressed data block from the second subspace;

compressing the fourth compressed data block at a fourth compression rate to obtain a fifth compressed data block, the third compression rate being less than the fourth compression rate; and writing the fifth compressed data block to the second subspace to create a second space fragment.

\* \* \* \* \*